Feb. 6, 1923.  
H. N. FULLER.  
CLUTCH PEDAL LOCK.  
FILED JULY 30, 1920.

1,443,949

INVENTOR.  
H.N.FULLER  
BY Milton S. Crandall  
ATTORNEYS.

Patented Feb. 6, 1923.

1,443,949

UNITED STATES PATENT OFFICE.

HURVY N. FULLER, OF OTO, IOWA.

CLUTCH-PEDAL LOCK.

Application filed July 30, 1920. Serial No. 400,289.

*To all whom it may concern:*

Be it known that I, HURVY N. FULLER, a citizen of the United States, and a resident of Oto, in the county of Woodbury and State of Iowa, have invented certain new and useful Improvements in Clutch-Pedal Locks, of which the following is a specification.

My present invention has for its primary object the production of an improved lock mechanism for the clutch-controlling levers of such motor vehicles as the Ford, which employs the planetary type of transmission gearing. A further object of the invention is the production of a clutch-pedal lock, inexpensive in construction, thoroughly efficient and dependable in operation, and readily applied to a Ford car.

Figure 1:
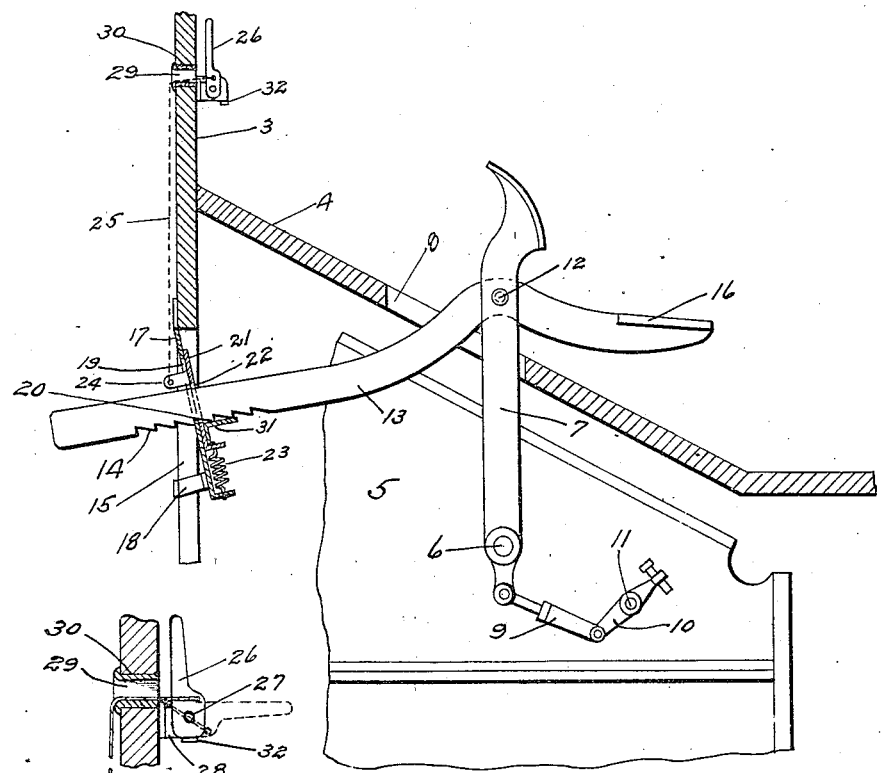
Figure 2:
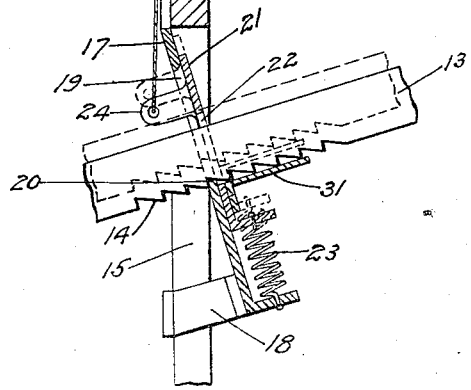

The above and other objects and advantages I successfully attain in the embodiment hereinafter described, defined in the appended claim and illustrated in the accompanying drawings which form a part of this application, and of which:

Fig. 1 is a side elevation of the clutch-pedal mechanism and associated parts of a Ford automobile, with the device of my invention applied thereto, parts being shown in section, and Fig. 2 is a vertical section of the detent mechanism and associated parts.

While I have illustrated and hereinafter described a preferred embodiment of the invention, I would not be understood as being limited to such specific construction, for various alterations and modifications may be made in the details of construction and arrangement of parts herein disclosed without departing from the spirit and scope of the invention as defined in the appended claim.

Referring now to the illustrations, 3 represents the dash of the vehicle, 4 the footboard, under which is mounted a transmission case, 5, having fulcrumed thereon, as at 6, the usual clutch-pedal, 7, extending through a slot, 8, in the floor-board, 4, and connected by a link, 9, with the lever, 10, carried by the clutch-shaft, 11.

The structure above set forth represents no part of my present invention, but serves to illustrate those parts of the vehicle with which the device of my invention is associated.

On the lever, 7, I fulcrum, as at 12, a lever, 13, which extends forwardly and downwardly through the slot, 8, and is provided on the under side of its front end portion with ratchet teeth, 14, the dash having a cut away portion, 15, to receive the said toothed end portion. The said lever, 13, extends a distance in the rear of the lever, 7, and is provided with a pedal portion, 16, suitably positioned for engagement, either by the toe or by the heel of the driver when his toe is on the pedal portion of the lever, 7.

To the front portion of the dash, immediately above the portion, 15, is secured the upper end of a plate, 17, which depends rearwardly through the opening, 15, at approximately right angles to the lever, 13, and has its lower end secured to the dash by a suitable bracket, 18. The plate, 17, is provided with a vertical slot, 19, through which the toothed end portion of the lever, 14, freely reciprocates, the teeth, 14, being engageable, as at 20, with the portion of the plate, 17, at the bottom of the slot therein.

On the rear face of the plate, 17, is a plate, 21, mounted to slide vertically on the plate, 17, and provided with a slot, 22, through which the lever, 13, is free to reciprocate. The lower end portion of said plate, 21, is connected by a retracting spring, 23, with the lower end portion of the plate, 17, which serves to hold the plate, 21, yieldably downwardly.

Above the lever, 13, the plate, 21, is provided with an arm, 24, extending forwardly through the slot, 19, and connected by a flexible link, 25, with a small lever, 26, fulcrumed as at 27, on a bracket, 28, mounted on the rear of the dash, the said link, 25, being free to slide through a suitable bushing, 29, inserted in an opening, 30, in the dash.

Below the lever, 13, the plate, 21, is provided with a flat member, 31, so positioned that when the lever, 26, is depressed to draw the plate, upwardly, the part, 31, will prevent engagement of the teeth, 14, with the detent, 20.

The lever, 26, is so constructed and the link, 25, so connected thereto that when the lever, 26, is depressed against the stop, 32, the link, 25, will be on a dead center with the lever fulcrum, 27, which prevents retrograde movement of the lever.

It will now be clear that when the lever, 26, is in its upwardly extended or normal position and the driver forces the clutch-pedal, 7, forwardly, the latter will be held against retraction by virtue of engagement of the teeth, 14, with the detent, 20, yet it may be released by either depressing the pedal, 16, or the lever, 26.

Having thus described my invention, what I claim as new and desire to secure by Letters Patent of the United States, is:

The combination with a motor vehicle, including a forwardly and rearwardly movable clutch-lever and a fixed vehicle part in front of such lever, of a lever fulcrumed on the clutch-lever and extended forwardly and rearwardly therefrom, a slotted plate secured to such part and through which said second lever extends, said second lever being toothed to engage the portion of the plate at the bottom of the slot, and means movable downwardly and upwardly on the plate to accordingly place said second lever in engageable and non-engageable relation to the plate.

In testimony whereof, I have hereto set my hand this 12th day of July, 1920.

HURVY N. FULLER.